July 30, 1963  E. W. JAHN  3,099,498
METHOD AND APPARATUS FOR MANUFACTURING RESIN COATED CORE SAND
Filed May 6, 1960  4 Sheets-Sheet 1

INVENTOR.
EARL W. JAHN
BY Chapin & Neal
ATTORNEYS

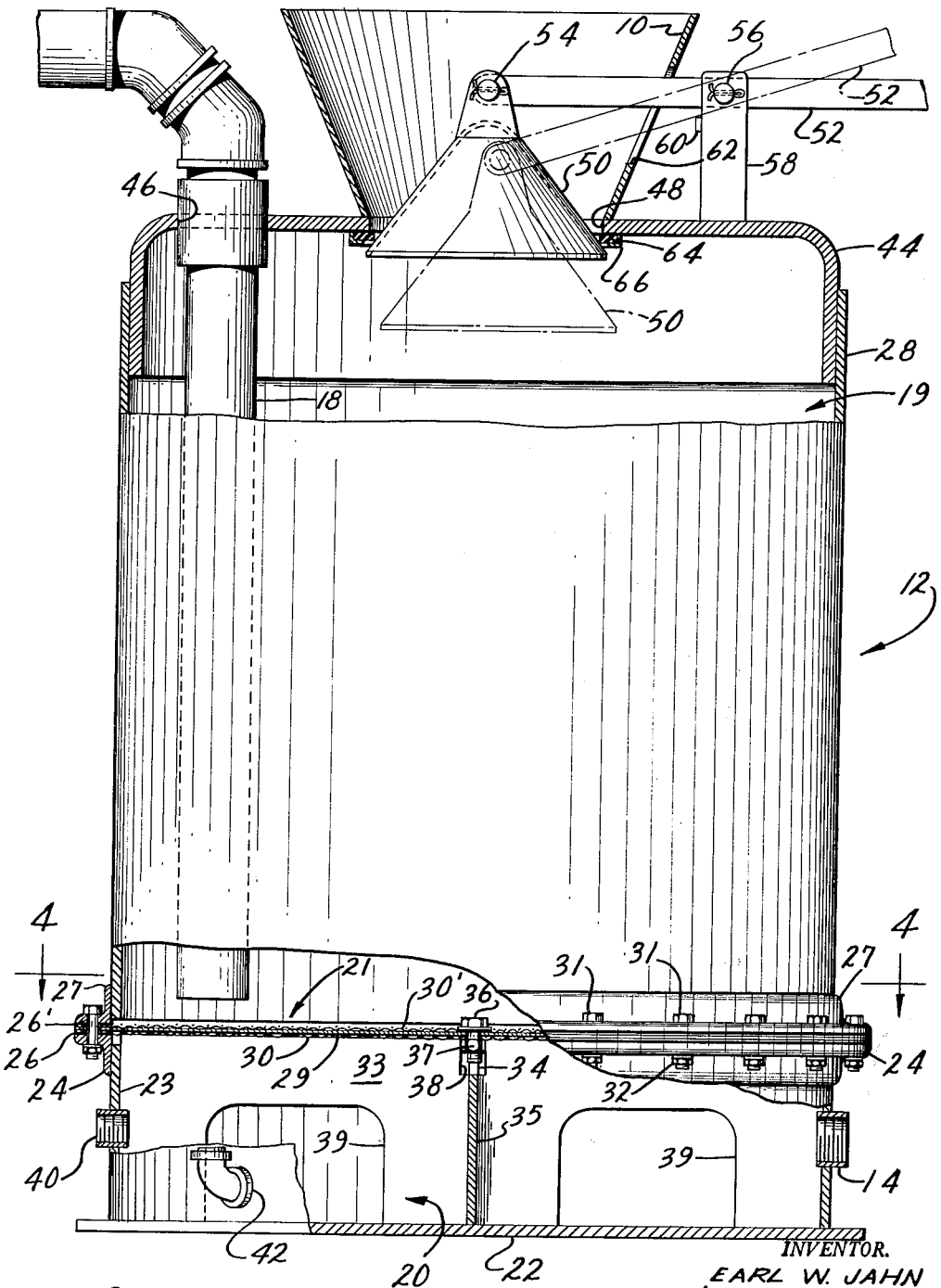

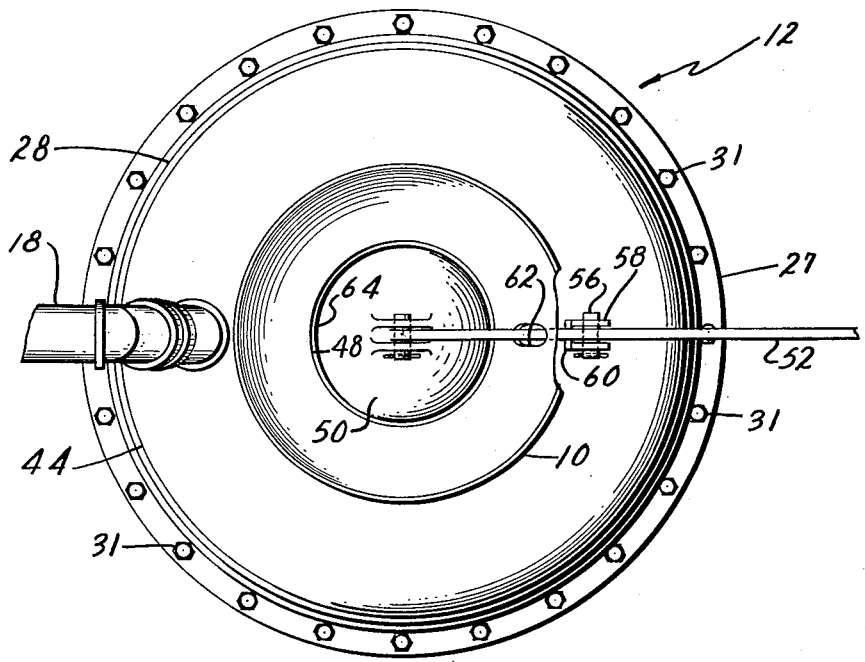
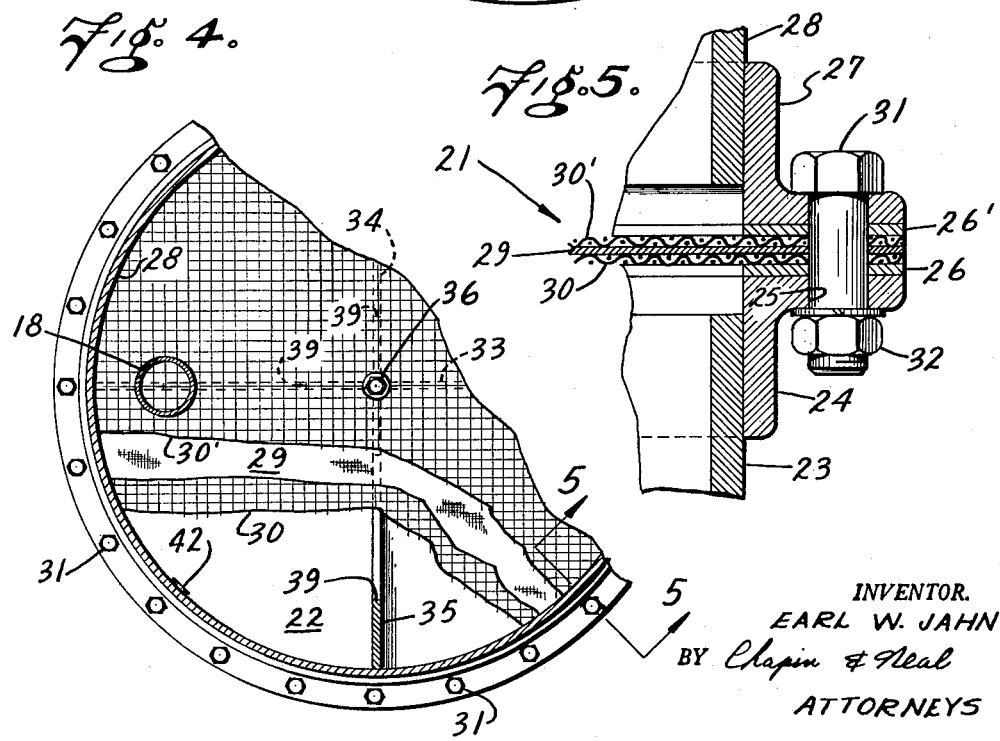

July 30, 1963  E. W. JAHN  3,099,498
METHOD AND APPARATUS FOR MANUFACTURING RESIN COATED CORE SAND
Filed May 6, 1960  4 Sheets-Sheet 4

INVENTOR.
EARL W. JAHN
BY Chapin & Neal
ATTORNEYS

United States Patent Office 3,099,498
Patented July 30, 1963

3,099,498
METHOD AND APPARATUS FOR MANUFACTURING RESIN COATED CORE SAND
Earl W. Jahn, Springfield, Mass., assignor to Shell Process Inc., West Springfield, Mass., a corporation of Massachusetts
Filed May 6, 1960, Ser. No. 27,985
2 Claims. (Cl. 302—53)

This invention relates to resin coating core type foundry sand and particularly to improvd methods and apparatus for pre-heating the sand before the coating is applied and for drying the coated sand.

This application is a continuation in part of my earlier filed application, Serial No. 4,510, filed January 25, 1960, now abandoned.

In present practice, one method of coating sand comprises charging a muller with sand, a thermosetting resin and a suitable resin solvent, mulling the charge sufficiently to coat the grains of sand with the resin solution and allowing the solvent to evaporate. This method is known as "cold coating."

Another method of manufacturing coated sand includes charging a muller with sand, a suitable thermosetting resin and a curing agent or catalyst. In the latter method, known as "hot coating," the sand is preheated in tumbling barrels before it is placed in the muller. The grains are coated with the melted resin and then allowed to cool to set the resin.

After the sand is resin coated, it is discharged in bulk from the muller before the resin coating has dried. On drying, particles of grains of coated sand stick together or agglomerate, forming caked lumps which must be broken up before the sand can be properly used for making mold cores. The caked lumps of coated sand are broken up by some such operation as by scrubbing on a screen or sieve. In addition to the obvious disadvantages involved in breaking up the lumps of sand, scrubbing may adversely affect the tensile strength of mold cores formed with such sand, since the scrubbing operation frequently abrades or damages the resin coating.

It is the primary object of this invention to provide improved methods of manufacturing resin coated sand which facilitates the handling of the sand and produces a product of uniform grade and fluent character.

It is another object of this invention to provide improved means for treating and handling core sand after it has been coated.

It is a further object of this invention to provide improved means for pre-heating sand and charging a muller before the coating operation.

The above and other objects and advantages of this invention will be apparent from the following description with reference to the accompanying drawings:

FIG. 2 is an elevation, partly in section, of the sand drying tank shown in FIG. 1;

FIG. 3 is a plan view of the drying tank;

FIG. 4 is a partial section on a reduced scale taken along line 4—4 of FIG. 2;

FIG. 5 is a section on an enlarged scale taken along line 5—5 of FIG. 4;

Figure 1:
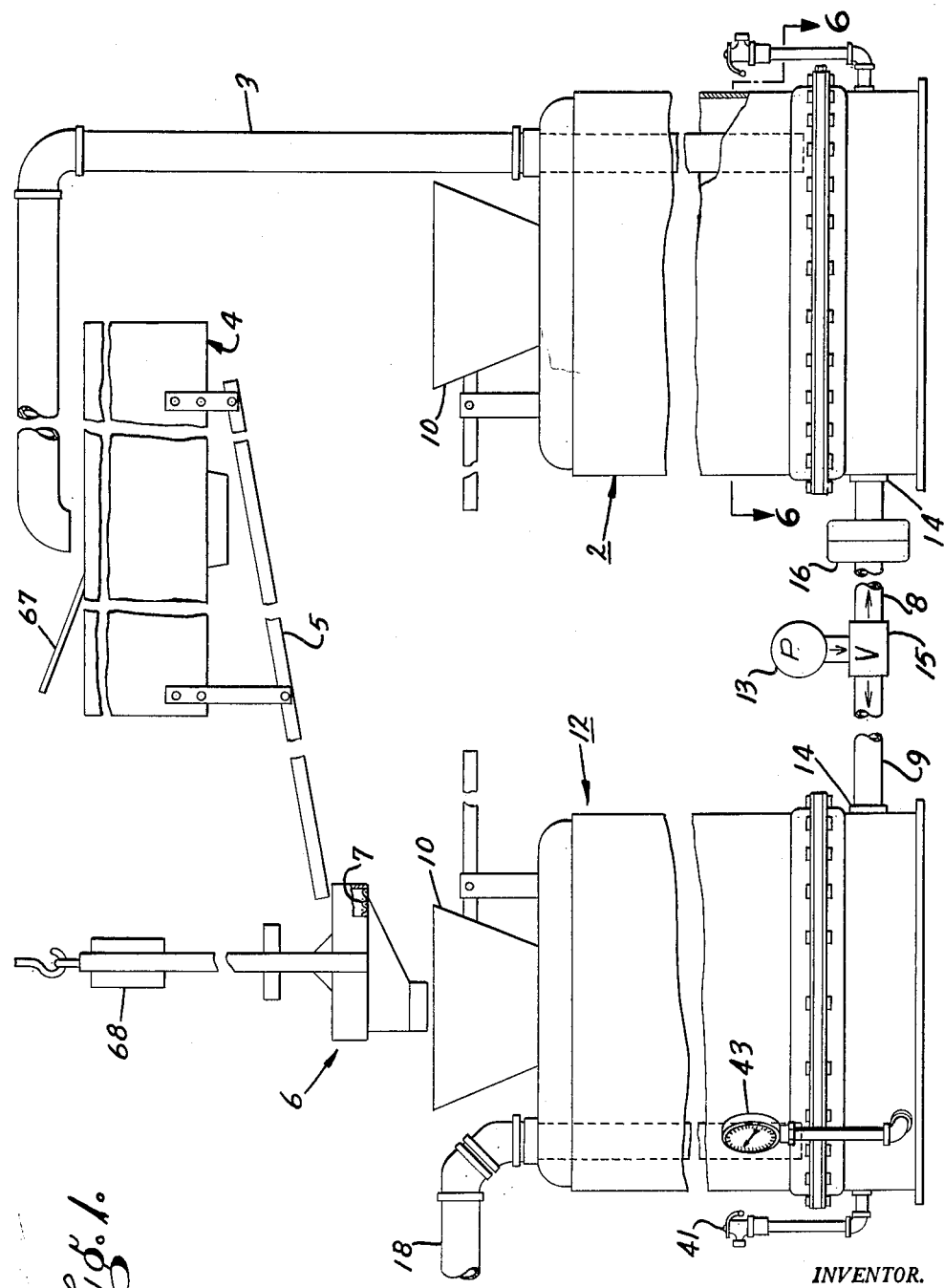
FIG. 1 is a diagrammatic showing of a system for manufacturing resin coated foundry sand embodying the invention.

Referring in detail to FIG. 1, a heating tank is shown generally at 2. The tank 2 is used for pre-heating sand before it is placed in the muller in the "hot coating process." A discharge tube 3 extends from the tank 2 providing means for conducting the heated sand from the tank 2 and depositing it in a muller 4.

The muller may be of conventional construction, including means for mixing sand and resin for coating the sand with the resin. One muller found suitable is known in the trade as a Simpson type No. 1-½ F mixer. One end of a conveyor or slide 5 is shown disposed below the discharge opening of this muller to receive the resin coated sand. The other end of the slide is disposed to discharge the sand into a known type of sifter or riddle 6.

The riddle may be of conventional construction such as a Combs Gyratory Foundry riddle marketed by the Great Western Manufacturing Co. The riddle includes a screen 7 of suitable mesh to sift the coated sand for removing any lumps or caked sand particles. The riddle discharges downwardly into a funnel intake 10 of a sand drying tank, indicated generally at 12.

A blower or compressor 13 is connected by conduits 8 and 9 to the lower portions of the tanks 2 and 12 respectively for supplying compressed air to both of the tanks. Valve means 15 controls the flow of air to the tanks. A heater 16 is provided for heating the air which is supplied to the tank 2. The air supply to the tank 12 is not heated; this air being used to dry and cool the resin coated sand. After the sand is dried in the tank 12, it is discharged by a tube 18 which extends from the top of the tank and terminates at a suitable storage bin.

The pre-heating tank 2 and the sand drying tank 12 are divided into upper and lower chambers by air permeable diaphragms to be described below. As shown, the tanks 2 and 12 are identical in construction, with the exception of their diaphragm construction and, in general, the same reference characters will be used to designate the same parts of the two tanks.

Referring in detail to FIG. 2, the sand drying tank 12 comprises upper and lower chambers 19 and 20 respectively separated by an air permeable diaphragm, indicated generally at 21. Compressed air is received in the lower chamber through a coupling 14 and passes upwardly through the diaphragm. The upwardly rising air is dispersed by the diaphragm 21 uniformly over the cross sectional area of the tank. The air disperses, agitates and dries the moist grains of sand received in the upper chamber, thus preventing agglomeration of the sand as it dries. The riddle insures that the sand is in a fluent condition when it is introduced into the drying tank. The air passing through the diaphragm also prevents the moist coated sand from remaining in contact with the diaphragm long enough to adhere thereto.

The tank 12 comprises a base plate 22; a cylindrical tank shell 23 extends upwardly from the base plate and is secured thereto by suitable means, such as welding. An annular flange 24 is secured to the upper outer edge portion of the shell 23 and includes a plurality of circumferentially spaced bolt receiving holes 25 (FIG. 5). A similar flange 27 is secured to the lower edge portion of an upper cylindrical tank shell 28. A felt pad 26 is cemented to the upper surface of the flange 24 and the under surface of the flange 27 is also provided with a felt pad 26'. As best shown in FIGS. 4 and 5, the diaphragm 21 comprises a sheet material 29 such as canvas duck disposed between a pair of superposed wire mesh screens 30 and 30' which prevents sagging or stretching of the canvas. The peripheral edge portions of the canvas and screens are held between the flanges 24 and 27. The portions of the screen and diaphragm between the flanges are suitably caulked to form an airtight seal between the opposed surfaces of the flanges. The flanges are held together by a plurality of screws and nuts 31 and 32 respectively. The lower chamber 20 is defined by the base plate 22, the diaphragm 21, and the shell 23.

The diaphragm 21 is supported in a generally horizontal condition by an upstanding plate 33 and plates 34 and 35 which extend upwardly from the base plate. The plates are disposed in cruciform arrangement extending radially from the center of the tank to the wall of the lower shell 23. The support plates include openings 39 which provide free air flow between the four sectors of the lower chamber as defined by the plates. Means is provided for holding down the center portion of the diaphragm to prevent bowing or stretching of the screens and canvas. In the embodiment shown, the hold-down means comprises a screw 36 which is threaded into a nut 37 welded in place between opposed inner edges of the support plates 34 and 35. The opposed upper corners of the plates are cut away as indicated at 38 to accommodate the nut 37.

The air inlet coupling 14 extends through the wall of the lower tank shell and is adapted to be connected to the blower 13. The lower shell also includes couplings 40 and 42 for connection to a safety valve 41 and air gauge 43 (FIG. 1).

A tank head 44 is suitably secured such as by welding, to the upper portion of the upper shell tank 28. The tank head 44, upper shell 28, and diaphragm 21 define the upper chamber 19. The tank head includes an opening 46 receiving the discharge pipe 18 which extends into the tank and terminates at its intake end a short distance above the upper screen 30'. The pipe may be secured in place by welding which seals the opening 46.

Centrally disposed in the tank head is a fill port or opening 48. A conically shaped cover or closure member 50 is mounted for selectively opening and closing the port and is controlled by a handle 52. The inner end of the handle 52 is pivotably attached to the top of the cover by a pin 54. The handle 52 is pivotably mounted on a pin 56 which is supported by a bracket 58 which extends upwardly from the upper surface of the tank head 44. The bracket 58 comprises a pair of spaced upstanding plates. Means for limiting the downward movement of the handle and cover comprises a bar 60 secured to the spaced plates of support bracket 58. The funnel 10 is welded to the tank head around the port 48 and includes a slot 62 through which the handle 52 extends. The slot 62 is vertically elongated permitting the handle to be pivoted sufficiently to open and close the cover 50. A seal 64 is mounted in an annular retaining ring 66 which is welded to the under surface of the tank head circumferentially of the port 48. The seal is preferably formed of rubber and extends inwardly of the edge defining tank head port to engage the outer surface of the tank cover.

The pre-heating tank 2 is identical to the drying tank 12, described above, except that the diaphragm is constructed to withstand relatively high temperatures generated within the tank by the heated air supply (preferably greater than 500° F.). It has been found that a diaphragm having a canvas member such as that of the drying tank 12, will not stand up under the high temperatures required for adequately pre-heating the sand.

Figure 6:
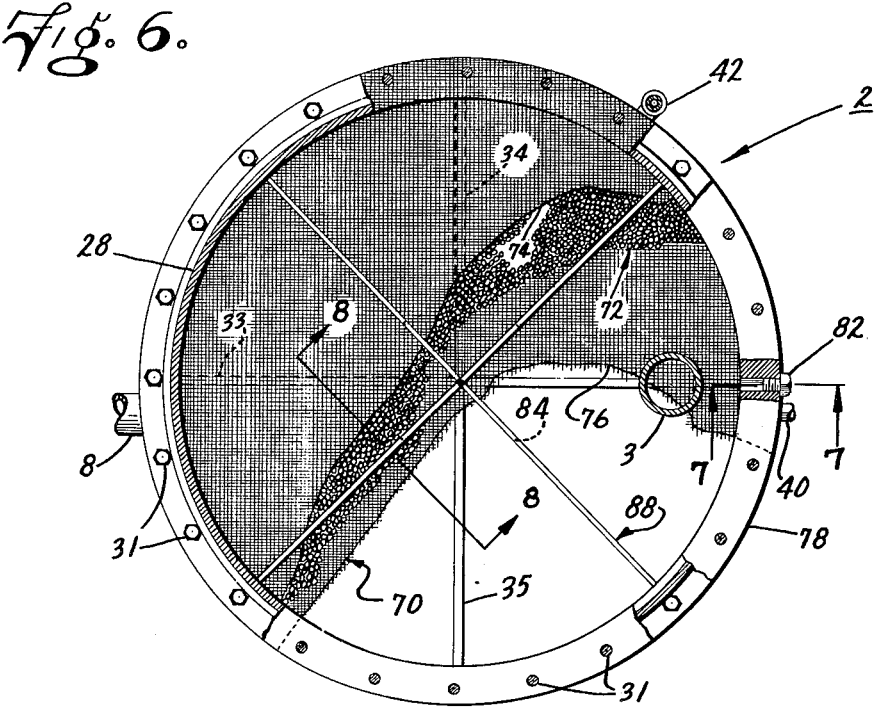
FIG. 6 is a section taken along line 6—6 of FIG. 1.
Figure 7:
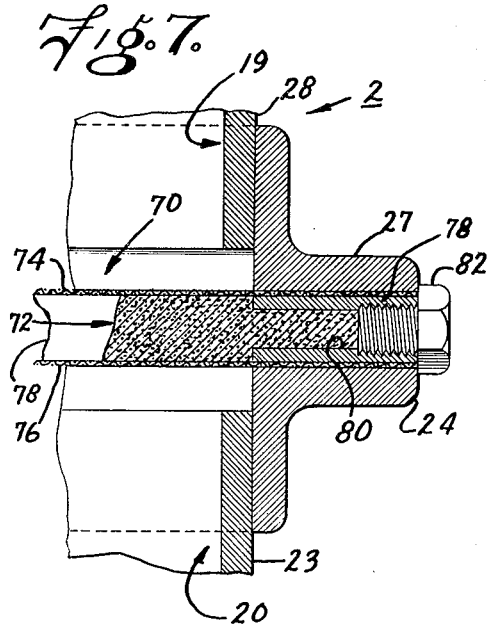
FIG. 7 is a section on an enlarged scale taken along line 7—7 of FIG. 6.

As shown in FIGS. 6 and 7, the diaphragm 70 of the heating tank 2 comprises a gas permeable material 72 disposed between a pair of spaced opposed wire cloth screens 74 and 76, preferably made of stainless steel. The mesh of the screens is fine enough to prevent the escape of the granular material used. In the embodiment shown, the gas permeable material is in the form of a granular heat-resistant material, such as silica sand, zircon sand or any other gas permeable material capable of withstanding the high tank temperatures and of uniformly dispersing or diffusing air forced upwardly therethrough. The screens 74 and 76 are secured tautly by their peripheral edge portions to the upper and lower surface of a ring 78. The ring 78 is fitted between the opposed flanges 24 and 27 of the tank (FIG. 7) and is provided with a plurality of circumferentially spaced holes positioned to receive securing bolts 31 as previously described in connection with tank 12 of FIG. 5. A port 80 extends radially through the ring 78 providing a means for filling the space between the screens with the granular material. A screw 82 is threaded into the port 80 providing a closure member for the fill hole.

Figure 8:
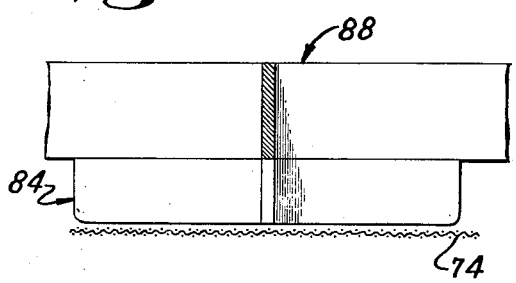
FIG. 8 is a section taken along line 8—8 of FIG. 6.

The center portion of the diaphragm 70 is held in place by a hold-down member 84 of cruciform configuration mounted on support brackets 88 which extend radially from the walls of the tank. The lower edges of the member 84 are contiguous with the center portion of the upper screen 74 (FIG. 8). The member 84 prevents undesirable upward bowing and stretching of the diaphragm under the pressure of the air in the lower chamber. This construction is preferable to the screw bolt 36 (FIG. 4) of the tank 12 since there is a tendency for this screen to stretch and pull away from the head of the bolt 36.

The space defined by the screens 74 and 76 and the ring 78 should be filled with the granular material 72 so that the material will be prevented from shifting and forming enlarged air passages therethrough. The unimpeded flow of air through such passages causes undesirable accumulations of sand on the upper surface of the diaphragm. The support plates 35–35 (FIG. 6) and the hold-down member 84 prevent sagging or stretching of the screens 74 and 76. The granular material 72 is thus constrained in a fixed layer between the screens.

The granular material 72 functions in a manner generally similar to the canvas duck used in the sand drying tank. In the absence of a suitable material for uniformly dispersing the air, the sand being treated in the tanks tends to accumulate at the periphery of the tank. Such accumulations inhibit the uniform drying or heating of the sand and result in an inferior product. One rganular material found suitable is sand of AFS fineness No. 100. Using this material it has been found that a generally uniform diffusion or dispersion of the air passing through the diaphragm is achieved. A suitable material for the screens 74 and 76 is stainless steel wire cloth having a 24 x 100 mesh.

While there are a number of suitable granular heat-resistant materials, sand offers many advantages especially to the manufacturer of coated sand since it is inexpensive, readily available and relatively easy to handle.

The "cold coating" method of preparing coated sand comprises pre-heating the muller 4 (FIG. 1) to a temperature of about 300° F. prior to depositing the sand and resin charge therein. In this method it is of advantage to use the tank 2 to preliminarily pre-heat the sand if the supply of sand is other than at room temperature or some other specified temperature. In this manner consistency of results and timing for subsequent treatments may be achieved without manipulating any of the various controls. Otherwise successive batches of sand when fed to the muller at different temperatures would result in a non-uniform end product if treated in the same way. Pre-heating to a uniform temperature enables the operator to maintain uniformity in treatment times and excellence of end product.

The thermosetting resin is preferably in powder form, such as phenol formaldehyde and furfuryl alcohol resins of the type marketed by the Hooker Electrochemical Company under the trademark "Durez" No. 18250. The amount of resin used is preferably from 4 to 6 percent by weight of the quantity of sand in the mixture. The sand and resin are thus mulled in a dry condition for a sufficient length of time to thoroughly mix them. A suitable solvent, such as is marketed by the U.S. Industrial Chemicals Co. under the trademark "Solox", and water are next added to the dry mixture in the proportion of about three parts "Solox" to one part water. Mulling is continued thereafter for about one minute with the cover 67 (FIG. 1) of the muller 4 closed to keep the dust, generated by the initial mixing, within the muller. The cover is then opened permitting the escape of moisture from the muller; the mulling is continued until the particles of sand are completely coated with resin. The coated sand is then discharged onto the slide 5 and into the riddle 6. The riddle is driven by motor 68 in a gyratory fashion. Any lumps of coated sand which do not pass through the sive 7 into the drying tank may be redeposited in the muller for preparation with the next batch of coated sand.

Air pressure in the lower chamber 20 (FIG. 2) of the drying tank is preferably maintained at a value of approximately 2–3 p.s.i. prior to the introduction of the coated sand into the tank and during the drying operation. With the tank cover 50 open, a current of air rises through the diaphragm and out of the tank through the port 48. The flow of air through the diaphragm before the charge is placed in the tank prevents the sand from adhering or caking on the diaphragm. When the sand is dropped into the upper chamber, the cover 50 is left open; the air pressure is maintained until the sand particles are thoroughly dry. As described above, the upwardly rising air fluffs and dries the sand in what might be termed a more or less fluid condition, preventing agglomeration of the grains. The rising stream of air is uniformly dispersed by the canvas duck. The individual particles of sand behave similar to a ball supported by a jet of air, that is, the particles alternately rise and fall on the rising air stream. When the sand is completely dried, the cover 50 is closed sealing the tank. The air pressure is increased sufficiently to pressurize the tank and force the coated sand through the discharge pipe 18, out of the tank to suitable storage bins.

Listed below is one specific illustration of ingredients and related process data suitable for practicing the invention:

Sand _____ 400 lbs. Marion sand AFS 100.
Resin _____ 16 lbs. Durez resin No. 18250.
Alcohol _____ 3 pints Solox.
Water _____ 1 pint.

Mull sand and resin in dry condition, 1 minute.
Mull after alcohol solution added, 14 minutes.
Fluff and dry sand for 12 to 15 minutes with cover of drying tank open, air pressure 2–3 p.s.i.
Discharge pressure, 15 p.s.i., cover closed, to move sand 15–20 ft.

The "hot coating" method of manufacturing coated sand comprises pre-heating the sand to a temperature approximately equal to the melting point of the resin which is to be used for coating the sand. The pre-heating is carried out in the upper chamber 19 of the heating tank 2. Heated air is supplied to the lower chamber 20 by means of the blower 13. The air is heated by the heater 16 sufficiently to raise the temperature of the sand to the approximate melting point of the resin. After the sand is brought to this temperature, the tank 2 is pressurized as described above by closing the cover and the sand is discharged through the tube 3 to be deposited in the muller 4. In this method, it is not necessary to pre-heat the muller as in the "cold coating" process. A suitable thermosetting resin such as a Novalak type phenolic resin is added to the muller. The sand and resin are mulled sufficiently to thoroughly mix them. A suitable catalyst or curing agent such as hexamethylenetetramine is then added. The mulling process is continued until the sand is almost free flowing. A release agent such as calcium stearate is added. After the mulling is continued for a short time longer, the sand is then fed to the drying tank 12, as described above. The rising stream of air passing through the diaphragm 21 dries and cools the sand sufficiently to set the resin and prevent the particles sticking together. The coated sand may then be discharged from the drying tank and conveyed to a storage bin by pressurizing the tank.

Listed below is one specific illustration of the ingredients and related process data suitable for practicing the "hot coating" process:

Sand, 97 parts by weight Marion sand.
Preheat sand to about 250° F. in heating tank.
Resin, 3 parts by weight granulated Novalak type phenolic resin, melting point between 200–240° F.
Mull sand and resin approximately 2–3 minutes.
Curing agent, 35 lbs. hexamethylenetetramine.
Mull after addition of curing agent until sand is almost free flowing.
Release agent, 0.1 lb. calcium stearate.
Mull after addition of release agent approximately 2 minutes.
Aerate sand in drying tank until cooled to a temperature below 160° F.

The processes and apparatus described above provide high-quality resin coated sand of uniformly high tensile strength and fluent character. Its fluent character enables it to be used immediately in a shell core blower or to be stored in bulk indefinitely.

Having thus described this invention, what is claimed is:

1. In the manufacture of resin coated sand, apparatus for treating sand comprising a chamber, a gas permeable diaphragm forming the bottom of said chamber, means forcing air upwardly into said chamber through said diaphragm with sufficient energy to maintain the grains of sand in a state of agitation, said diaphragm comprising spaced opposed screens, the space between said screens being filled with a heat-resistant fluent, granular material, means for increasing the pressure of the gas in said chamber, and a conduit extending from said chamber for conveying the contents of said chamber to any desired location.

2. Apparatus as set forth in claim 1 in which said screens are wire mesh and said granular material is sand, and means for introducing said sand into the space between said screens.

References Cited in the file of this patent
UNITED STATES PATENTS

| | | |
|---|---|---|
| 2,059,983 | Dent et al. | Nov. 3, 1936 |
| 2,448,745 | Struckmann | Sept. 7, 1948 |
| 2,586,818 | Harms | Feb. 26, 1952 |
| 2,666,269 | Parry | Jan. 19, 1954 |
| 2,785,478 | Audas et al. | Mar. 19, 1957 |
| 2,807,556 | Stark | Sept. 24, 1957 |
| 2,816,803 | Clark | Dec. 17, 1957 |
| 2,844,489 | Gemmer | July 22, 1958 |
| 2,915,338 | Loomis | Dec. 1, 1959 |
| 2,919,159 | Lacroix | Dec. 29, 1959 |
| 2,924,489 | Beckmann | Feb. 9, 1960 |
| 2,965,514 | Less et al. | Dec. 20, 1960 |